United States Patent
Park et al.

(10) Patent No.: US 11,616,274 B2
(45) Date of Patent: Mar. 28, 2023

(54) LITHIUM SECONDARY BATTERY

(71) Applicants: Hyundai Motor Company, Seoul (KR); Kia Motors Corporation, Seoul (KR)

(72) Inventors: Sang Mok Park, Gyeonggi-do (KR); Yeolmae Yeo, Gyeonggi-do (KR); Dongjun Kim, Gyeonggi-do (KR); Yoon Sung Lee, Gyeonggi-do (KR); Jieun Lee, Gyeonggi-do (KR); Sa Heum Kim, Gyeonggi-do (KR); Seung-Min Oh, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 188 days.

(21) Appl. No.: 16/573,070

(22) Filed: Sep. 17, 2019

(65) Prior Publication Data

US 2020/0185678 A1 Jun. 11, 2020

(30) Foreign Application Priority Data

Dec. 11, 2018 (KR) .......................... 10-2018-0159533

(51) Int. Cl.
*H01M 50/46* (2021.01)
*H01M 4/66* (2006.01)
*H01M 10/0525* (2010.01)
*H01M 50/44* (2021.01)

(52) U.S. Cl.
CPC ......... *H01M 50/461* (2021.01); *H01M 4/664* (2013.01); *H01M 10/0525* (2013.01); *H01M 50/44* (2021.01)

(58) Field of Classification Search
None
See application file for complete search history.

(56) References Cited

U.S. PATENT DOCUMENTS

| 9,601,740 B2 * | 3/2017 | Lee ..................... H01M 50/431 |
| 2004/0106037 A1 * | 6/2004 | Cho ..................... H01M 50/403 |
| | | 427/126.3 |
| 2011/0183166 A1 * | 7/2011 | Suga .................... H01M 50/543 |
| | | 429/61 |
| 2011/0183456 A1 | 7/2011 | Hsieh et al. |
| 2012/0219841 A1 * | 8/2012 | Bolandi ............... H01M 50/414 |
| | | 427/446 |
| 2015/0162588 A1 | 6/2015 | Lee et al. |
| 2015/0318528 A1 * | 11/2015 | Iwai .................... H01M 50/461 |
| | | 429/145 |
| 2016/0312626 A1 * | 10/2016 | Schetzel ................. F01D 5/284 |
| 2018/0294457 A1 * | 10/2018 | Torita .................. H01M 4/1391 |

FOREIGN PATENT DOCUMENTS

| CN | 102569701 | * | 7/2012 |
| CN | 102569881 A | | 7/2012 |
| CN | 105322177 | * | 2/2016 |
| CN | 107785519 A | | 3/2018 |
| KR | 1020160032965 | * | 3/2016 |

OTHER PUBLICATIONS

Machine translation of CN 105322177, published on Feb. 10, 2016 (Year: 2016).*
Machine translation of CN 102569701, published on Jul. 11, 2012 (Year: 2012).*
Machine translation of KR1020160032965, published on Mar. 25, 2016 (Year: 2016).*
Fibrous-Definition, Meaning-Merriam-Webster online dictionary, available at https://www.merriam-webster.com/dictionary/fibrous, date unknown.*
First Office Action for Chinese Patent Application No. 20190977883. 4, dated Nov. 3, 2022, 13 pages, with English translation.
First Office Action for Chinese Patent Application No. 2022103101899390, dated Nov. 3, 2022, 13 pages, with English translation.

* cited by examiner

*Primary Examiner* — Anca Eoff

(74) *Attorney, Agent, or Firm* — Fox Rothschild LLP

(57) ABSTRACT

Disclosed is lithium secondary battery that may include: a positive electrode; a negative electrode; an electrolyte; and a separator positioned between the positive electrode and the negative electrode. The separator may include: a separator substrate; and a fibrous adhesive layer formed on one or both surfaces of the separator substrate.

12 Claims, 6 Drawing Sheets

LITHIUM SECONDARY BATTERY

CROSS REFERENCE TO RELATED APPLICATION

This application is based on and claims priority under 35 U.S.C. § 119 to Korean Patent Application No. 10-2018-0159533, filed on Dec. 11, 2018 in the Korean Intellectual Property Office, the disclosure of which is incorporated herein by reference.

TECHNICAL FIELD

The present invention relates to a lithium secondary battery.

BACKGROUND

In general, a lithium secondary battery has a higher operating voltage and a higher energy density than a lead or nickel/cadmium battery by containing an electroactive material. Accordingly, lithium secondary batteries have been used as energy storage devices for electric vehicles (EVs) and hybrid electric vehicles (HEVs).

Securing safety of electric vehicles is an important issue. The purpose of using the separator in a lithium secondary battery is to block the physical contact between a positive electrode and a negative electrode to prevent the danger of ignition and explosion due to heat generated when the positive electrode and the negative electrode are in contact with each other.

A separator applied to conventional lithium secondary batteries uses a polyolefin-based porous substrate, and when a battery is overcharged, polyolefin melts in a high-temperature atmosphere thereby closing pores of the separator and blocking current so that the overcharging is prevented from proceeding, therefore the separator functions to secure safety.

The polyolefin-based porous substrate has an extreme heat shrinkage behavior at a temperature of 100° C. or greater due to material properties and characteristics of a manufacturing process including directional stretching, thereby causing a short circuit between the negative electrode and the positive electrode.

Accordingly, it is necessary to develop a lithium secondary battery capable of solving the above-described problems.

SUMMARY

In preferred aspects, provided is a lithium secondary battery having improved shape stability and output characteristics by introducing a fibrous layer into a separator or an electrode.

In an aspect, provided is a lithium secondary battery includes: a positive electrode; a negative electrode; an electrolyte; and a separator positioned between the positive electrode and the negative electrode, wherein the separator includes a separator substrate; and a fibrous layer formed on one or both surfaces of the separator substrate.

The fibrous adhesive layer suitably may have a fiber diameter of about 100 to 900 nm, although materials of a variety of configurations and dimensions can be suitable.

The fibrous adhesive layer suitably may have a thickness of about 0.5 to 3 µm, although adhesive fibrous layers of other thicknesses can be suitable.

In one aspect, preferred materials of a fibrous adhesive layer can adhere to ceramic particles upon admixing with ceramic particles as disclosed herein, including to form a surface or coating layer of the fibrous layer over the ceramic particles as disclosed herein. This adherence may or may not include any covalent bond formation between the adhesive fibrous material and the ceramic particle. In particular aspects, the adherence between a fibrous adhesive layer and ceramic layer can involve small or effectively no covalent bond linkages.

Generally preferred fibrous materials may be organic materials, including organic polymers which may have various functionality or substitution such as halogen (e.g. fluoro), hydroxyl or alcohol, ester, or carboxyl (e.g —COOH).

More particularly, in certain aspects, the fibrous adhesive layer may suitably include a polymeric material including one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof.

The separator may further include a ceramic coating layer.

The fibrous adhesive layer may suitably include, for example, be formed by mixing: ceramic particles; and a polymeric material including one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof.

The ceramic particles may suitably include one or more ceramic materials selected from the group consisting of $Al_2O_3$, $SiO_2$, $TiO_2$, $Al(OH)_3$, and $Mg(OH)_2$.

The ceramic particles may have a diameter of about 20 to 100 nm.

A content of the ceramic particles may be about 10 to 30% by weight based on the total weight of the fibrous adhesive layer.

In another aspect, provided is a lithium secondary battery may include: an electrode including a positive electrode and a negative electrode; a separator positioned between the positive electrode and the negative electrode; and an electrolyte. The electrode may include an electrode current corrector; an active material layer; and a fibrous adhesive layer formed on the active material layer.

The fibrous adhesive layer suitably may have a fiber diameter of about 100 to 900 nm, although as discussed other diameters also may be suitable.

The fibrous adhesive layer suitably may have a thickness of about 0.5 to 3 µm, although as discussed other thicknesses also may be suitable.

The fibrous adhesive layer may suitably include, for example, be formed of a polymeric material including one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof.

The fibrous adhesive layer may suitably include, for example, be formed by mixing ceramic particles and a polymeric material including one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof.

The ceramic particles may suitably include one or more ceramic materials selected from the group consisting of $Al_2O_3$, $SiO_2$, $TiO_2$, $Al(OH)_3$, and $Mg(OH)_2$.

The ceramic particles may have a diameter of about 20 to 100 nm.

A content of the ceramic particles suitably may be about 10 to 30% by weight based on the total weight of the fibrous adhesive layer.

Further provided is a vehicle including the lithium secondary battery described herein.

The lithium secondary battery according to exemplary embodiments of the present invention may have improved adhesion between the electrode and the separator by introducing a fibrous adhesive layer to secure shape stability of a cell and improved output characteristics of the battery by reducing cell resistance.

Other aspects of the invention are disclosed infra.

DETAILED DESCRIPTION

Like reference numerals refer to like elements throughout this specification. This specification does not describe all components of embodiments, and general information in the technical field to which the present invention belongs or overlapping information between the embodiments will not be described.

Throughout the specification, when a section is referred to as "containing" an element, it means this does not exclude other components unless specifically stated to the contrary, but may include other components.

As used herein, the singular forms "a," "an" and "the" are intended to include the plural forms as well, unless the context clearly indicates otherwise.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments according to the present invention will be described in detail with reference to the accompanying drawings. A lithium secondary battery will be described, and then a separator and an electrode into which a fibrous adhesive layer according to the disclosed embodiment is introduced will be described in detail.

Lithium secondary batteries generally include a positive electrode, a negative electrode, a separator, and an electrolyte. The positive electrode, the negative electrode, and the electrolyte may be those conventionally used in the manufacture of lithium secondary batteries.

The electrode may be formed by applying an electrode slurry prepared by mixing an electrode active material, a conductive material, a solvent, and a binder on an electrode current corrector to a predetermined thickness, followed by drying and rolling.

The electrode current corrector is not particularly limited as long as it has high conductivity without causing chemical change in the lithium secondary battery. For example, stainless steel, aluminum, nickel, titanium, sintered carbon, or aluminum or stainless steel surface-treated with carbon, nickel, titanium, silver or the like may be used as the electrode current corrector. It is possible to form fine irregularities on the surface of the current collector to increase the adhesive force of the positive electrode active material or to form various forms such as a film, a sheet, a foil, a net, a porous structure, a foam, and a nonwoven fabric.

The negative electrode active material used for manufacturing the negative electrode may be any active material capable of intercalating or deintercalating lithium ions. The negative electrode active material may be formed of any one or a combination of two or more materials selected from the group consisting of a material capable of reversibly intercalating and deintercalating lithium, a metal material alloyable with lithium, and a mixture thereof.

The material capable of reversibly intercalating or deintercalating lithium may include at least one selected from the group consisting of artificial graphite, natural graphite, graphitized carbon fibers, graphitized mesocarbon microbeads, fullerene, and amorphous carbon.

Amorphous carbon may include hard carbon, coke, MCMB and MPCF calcined at a temperature of about 1500° C. or less. Also, the metal material alloyable with lithium may include at least one metal selected from the group consisting of Al, Si, Sn, Pb, Zn, Bi, In, Mg, Ga, Cd, Ni, Ti, Mn and Ge. These metal materials may be used alone or as a mixture or alloy. In addition, the metal material may be used as a composite material mixed with a carbon-based material.

The negative electrode active material may include silicon. It may also include a graphite-silicon complex. The negative electrode active material containing silicon refers to a negative active material including silicon oxide, silicon particles, silicon alloy particles, or the like. Representative examples of the alloys include solid solutions of aluminum (Al), manganese (Mn), iron (Fe), titanium (Ti), or the like in silicon, intermetallic compounds, and eutectic alloys, but are not limited thereto.

The positive electrode active material includes a compound capable of reversibly intercalating or deintercalating lithium. Specifically, at least one of a complex oxides of lithium and a metal selected from cobalt, manganese, nickel, and any combination thereof may be used as the positive electrode active material.

The conductive material as used herein may improve the electrical conductivity. The conductive material is not particularly limited as long as it is an electroconductive material that does not cause chemical change in the lithium secondary battery. For example, graphite such as natural graphite or artificial graphite; carbon black such as acetylene black, ketjen black, channel black, furnace black, lamp black, and thermal black; conductive fibers such as carbon fiber and metal fiber; metal powders such as carbon fluoride, aluminum, and nickel powder; conductive whisker such as zinc oxide and potassium titanate; conductive metal oxides such as titanium oxide; conductive materials such as polyphenylene derivatives; and the like may be used.

As a binder, an aqueous binder such as carboxymethyl cellulose (CMC) and styrene-butadiene rubber (SBR) may be used for the negative electrode and polyvinylidene fluoride (PVDF) may be used for the positive electrode.

When the negative electrode includes graphite and a silicon composite, the binder may be prepared as a mixed binder in which an aqueous binder used in a graphite-based negative electrode such as CMC/SBR is mixed with a polymer binder such as Heparin, Dopamine-polymerized Heparin, and lithium polyacrylate (LiPAA) used for improvement of adhesion strength and inhibition of volume expansion a silicon-based negative electrode in order to improve adhesion strength.

The electrodes according to an exemplary embodiments may further include other components such as a dispersion medium, a viscosity modifier, and a filler as additives in addition to the above-described electrode active material, conductive material, and binder.

The electrolyte includes a lithium salt and a non-aqueous organic solvent and may further include additives for improving charge/discharge characteristics, preventing overcharge, and the like. Examples of the lithium salt include any one or a combination of two or more materials selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

As the non-aqueous organic solvent, carbonate, ester, ether or ketone may be used alone or in combination. Examples of the carbonate include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), fluoroethylene carbonate (FEC), vinylene carbonate (VC) and the like may be used. As the ester, γ-butyrolactone (GBL), n-methyl acetate, n-ethyl acetate, n-propyl acetate and the like may be used and as the ether, dibutyl ether and the like may be used, but are not limited thereto.

The non-aqueous organic solvent may further include an aromatic hydrocarbon organic solvent. Examples of the aromatic hydrocarbon organic solvent include benzene, fluorobenzene, bromobenzene, chlorobenzene, cyclohexylbenzene, isopropylbenzene, n-butylbenzene, octylbenzene, toluene, xylene, mesitylene, and the like, which is used alone or in combination.

A separator is provided for providing a path for lithium ion migration in the lithium secondary battery and physically separating the two electrodes from each other, and the separator is not particularly limited as long as it is used as a separator material in a lithium secondary battery. Particularly, it is preferable that the separator has low resistance against ion migration of the electrolyte and excellent electrolyte retaining capability.

For example, the separator substrate may be a conventional porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, used alone or in a stacked structure.

Meanwhile, various methods of attaching a separator to an electrode have been used to prevent separation between the electrode and the separator and to prevent leakage of the electrolyte. However, when the binder content is increased to improve the adhesive strength, the pores are clogged resulting in an increase in cell resistance and deterioration in impregnation property and high-rate property of the electrolyte.

Figure 1:
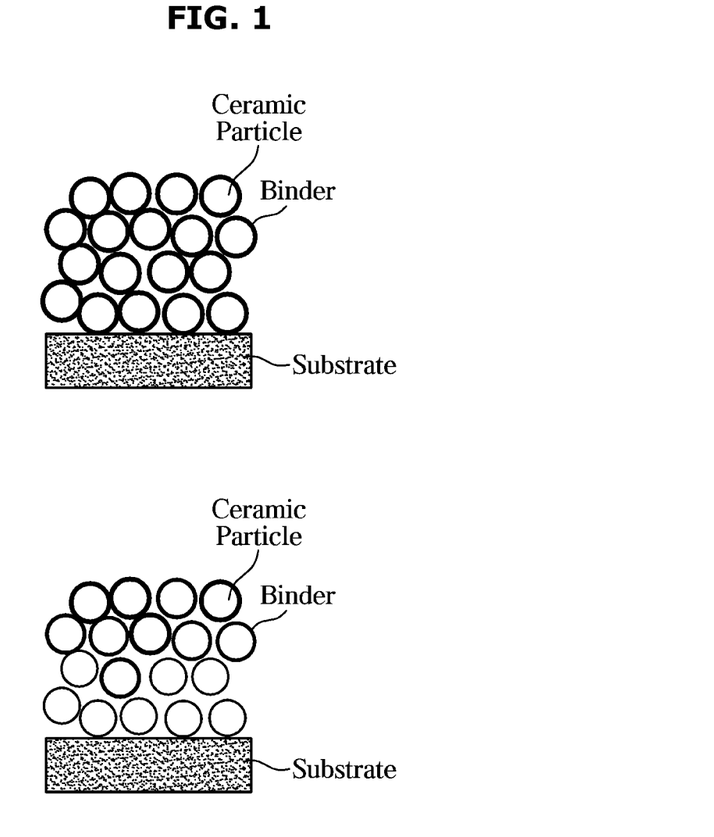
FIG. 1 shows a cross-sectional view of a conventional adhesive type ceramic separator.

FIG. 1 is a cross-sectional view of a conventional adhesive type ceramic separator.

As shown in FIG. 1, when a ceramic coating containing a binder is introduced onto a separator substrate, it is confirmed that the porosity between the ceramic particles is reduced by the binder as the binder content increases. Although a separate coating process is performed after ceramic coating on a separator substrate, a binder film is formed on the surface of a ceramic layer, or a binder solution penetrates into the ceramic layer, thereby reducing the porosity.

According to various exemplary embodiments of the present invention, provided is a lithium secondary battery in which a fibrous adhesive layer is introduced onto a separator substrate or an electrode current corrector to secure pores, thereby reducing cell resistance and improving adhesion.

A lithium secondary battery may include a positive electrode; a negative electrode; electrolyte; and a separator positioned between the positive electrode and the negative electrode, wherein the separator includes: a separator substrate; and a fibrous adhesive layer formed on one or both surfaces of the separator substrate.

Hereinafter, the fibrous adhesive layer of the lithium secondary battery according to an exemplary embodiment will be described in detail.

Figure 2:
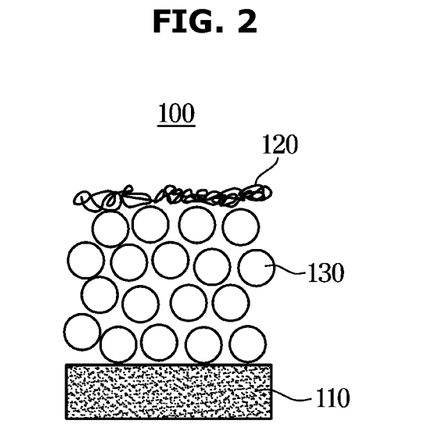
FIG. 2 shows a cross-sectional view of an exemplary separator into which an exemplary fibrous adhesive layer according to an exemplary embodiment of the present invention is introduced.

FIG. 2 shows a cross-sectional view of an exemplary separator into which an exemplary fibrous adhesive layer according to an exemplary embodiment of the present invention is introduced.

A separator 100 may include a separator substrate 110 and a fibrous adhesive layer 120 formed on one or both sides of the separator substrate 110.

Preferably, a ceramic coated separator (CCS) in which a ceramic layer 130 may be introduced onto the separator substrate 110 may be used. The ceramic layer 130 may include, or be formed using one or more ceramic materials such as alumina, boehmite, magnesium hydroxide, titanium oxide, and aluminum nitride.

The fibrous adhesive layer 120 may be in the form of a porous web and may be formed on one or both sides of the separator substrate 110.

Also, the fibrous adhesive layer has a thickness of about 0.5 to 3 μm. When the thickness of the fibrous adhesive layer is less than about 0.5 μm, the adhesive force may be reduced and cell assembly may not be formed sufficiently. When the thickness is greater than about 3 μm, the entire cell thickness may increase to reduce output power per unit volume.

The fibrous adhesive layer may have a fiber diameter of about 100 to 900 nm. When the diameter of the fiber is less than 100 nm, there is a problem in cell assembly due to low mechanical properties, and when the diameter exceeds 900 nm, it is difficult to prevent short circuits between the electrodes.

The fibrous adhesive layer may be formed by a binder polymer fiber, the binder polymer fiber may be formed by ejecting a binder polymer solution in which a binder polymer may be dissolved in a solvent through a spinning nozzle to which a high voltage may be applied in an electro spinning apparatus.

At this time, the binder polymer may suitably include a material capable of bonding an electrode and a separator and the binder polymer may include one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof. Preferably, the binder polymer may be a PVDF-based polymeric material.

A PVDF-based polymer may suitably include a copolymer including, in addition to the vinylidene fluoride monomer unit, a comonomer unit selected from the group consisting of hexafluoropropylene, chlorotrifluoroethylene, tetrafluoroethylene, trifluoroethylene, trichlorethylene, ethylene, hexafluoroisobutylene, perfluorobutyl ethylene, perfluoropropyl vinyl ether, perfluoromethyl vinyl ether, perfluoro-2,3-dimethyl-1,2-dioxol, and perfluoro-2-methylene-4-methyl-1,2-dioxolane.

The PAA-based polymer may suitably include, in addition to a polyacrylic acid unit, poly(sodium acrylate), poly (potassium acrylate), and ploy (lithium acrylate).

The solvent may be any organic solvent mixed with the binder polymer to form microfine fibers by an electrospinning device without limitation, and examples of the solvent may include acetone, methanol, propanol, dimethylformamide (DMF), or methylpyrrolidone (NMP).

The manufactured fibrous adhesive layer may exhibit an adhesive force when pressure is applied thereto or pressure and heat are simultaneously applied thereto during the manufacturing process of a battery cell. For example, by forming the binder layer in a fibrous form only on the surface of the separator substrate or the ceramic layer, the adhesive force may be realized while minimizing the content of the binder. Further, since most of the fibers are present on the surface of the separator substrate or the ceramic layer and do not penetrate into the pores, the passage of lithium ions may be secured, thereby improving the output characteristics and facilitating the electrolyte impregnation.

Figure 3:
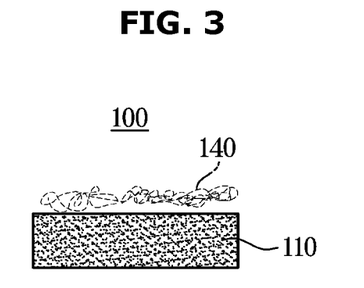
FIG. 3 shows a cross-sectional view of an exemplary separator into which an exemplary fibrous adhesive layer according to an exemplary embodiment of the present invention is introduced.

FIG. 3 shows a cross-sectional view of a separator into which a fibrous adhesive layer according to an exemplary embodiment of the present invention is introduced.

Also, the fibrous adhesive layer may suitably include, or be formed by mixing ceramic particles with a polymeric material including one or more selected from the group consisting of a polyacrylic acid (PAA)-based polymeric material, a styrene-butadiene rubber (SBR)-based polymeric material, a polyvinylidene fluoride (PVDF)-based polymeric material, a polyvinyl alcohol (PVA)-based polymeric material, and a poly vinyl acetate-based polymeric material, and a copolymer thereof.

By mixing ceramic materials, which is electrochemically stable inorganic substances, it is possible to secure an adhesive force between the electrode and the separator and to prevent shrinkage of the separator at a high temperature of about 100° C. or greater.

The ceramic particles may suitably include, or be formed of oxides such as $Al_2O_3$, $SiO_2$, and $TiO_2$ and hydroxides such as $Al(OH)_3$ and $Mg(OH)_2$.

At this time, the ceramic particles may have a diameter of about 20 to 100 nm. When the diameter of the ceramic particle is less than about 20 nm, it is difficult to disperse the ceramic particles, and when the diameter of the ceramic particle is greater than about 100 nm, the adhesive layer may be hardly retained in a fiber form and there arises a problem that the diameter of the fiber must be increased.

The content of the ceramic particles is about 10 to 30% by weight based on the total weight of the fibrous adhesive layer. When the content of the ceramic particles is less than about 10%, it is difficult to secure the heat resistance of the separator. When the content of the ceramic particles is greater than about 30%, the adhesive layer may hardly be retained in a fiber form.

The manufactured thus fibrous adhesive layer may exhibit an adhesive force when pressure is applied thereto or pressure and heat are simultaneously applied thereto during the manufacturing process of the battery cell. For example, by forming the binder layer in a fibrous form only on the surface of the separator substrate or the ceramic layer, the adhesive force may be realized while minimizing the content of the binder. In addition, heat resistance and energy density of the lithium secondary battery may be obtained without the need to separately form a ceramic layer.

Also, since most of the fibers are present on the surface of the separator substrate or the ceramic layer and do not penetrate into the pores of the separator substrate, the passage of lithium ions may be secured, thereby improving the output characteristics and facilitating the electrolyte impregnation.

Meanwhile, the above-described fibrous adhesive layer may be applied to an electrode.

A lithium secondary battery according to another aspect includes an electrode including a positive electrode and a negative electrode; a separator positioned between the positive electrode and the negative electrode; and an electrolyte. The electrode includes: an electrode current corrector; an active material layer; and a fibrous adhesive layer formed on the active material layer.

Figure 4:
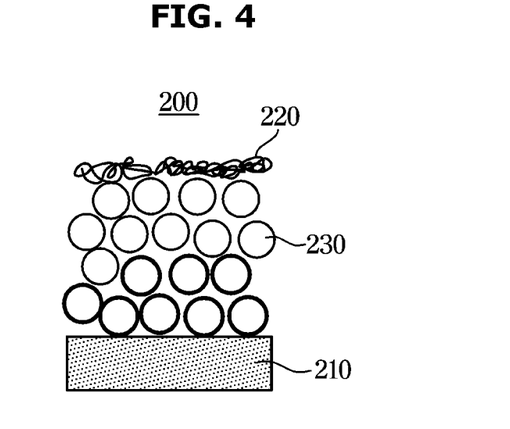
FIG. 4 shows a cross-sectional view of an exemplary electrode into which an exemplary fibrous adhesive layer according to an exemplary embodiment of the present invention is introduced.

FIG. 4 shows a cross-sectional view of an electrode into which a fibrous adhesive layer according to an exemplary embodiment of the present invention is introduced.

An electrode 200 according to an exemplary embodiment includes an electrode current corrector 210, an active material layer 230, and a fibrous adhesive layer 220 formed on the active material layer 230.

The electrode current corrector 210 may include or be formed of a material having conductivity.

The active material layer 230 may suitably be formed by applying an electrode slurry prepared by mixing an electrode active material, a conductive material, and a solvent onto the electrode current corrector 210 to a predetermined thickness, followed by drying and rolling.

The fibrous adhesive layer 220 may be in the form of a porous web and may be formed on active material layer 230. A thickness and a fiber diameter of the fibrous adhesive layer may be the same as those in the case where they are introduced into the above-described separator.

Figure 5:
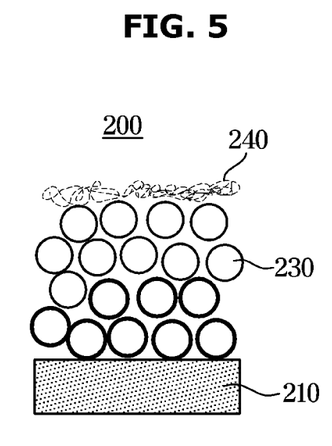
FIG. 5 shows a cross-sectional view of an \ exemplary electrode into which a fibrous adhesive layer according to another embodiment of the present invention is introduced.

Similarly, the fibrous adhesive layer 240 may be prepared by mixing a binder polymer fiber and a ceramic material.

FIG. 5 shows a cross-sectional view of an electrode into which a fibrous adhesive layer according to an exemplary embodiment of the present invention is introduced.

The manufactured fibrous adhesive layer may exhibit an adhesive force when pressure is applied thereto or pressure and heat are simultaneously applied thereto during the manufacturing process of a battery cell. For example, by forming the binder layer in a fibrous form only on the surface of the active material layer, the adhesive force may be realized while minimizing the content of the binder.

Also, since most of the fibers are present on the surface of the active material layer and do not penetrate into the pores of the electrode current corrector, the passage of lithium ions may be secured, thereby improving the output characteristics and facilitating the electrolyte impregnation.

In addition, when introducing a fibrous adhesive layer 240 including ceramic materials, heat resistance and energy density of the lithium secondary battery may be secured without the need to separately form a ceramic layer. Also, by forming a resistance layer on the electrode surface, it is possible to realize a relatively safe cell when an internal short circuit occurs due to a breakage of a separator or the like.

Hereinafter, a method of applying the above-described fibrous adhesive layer to a separator or an electrode will be described.

Figure 6:
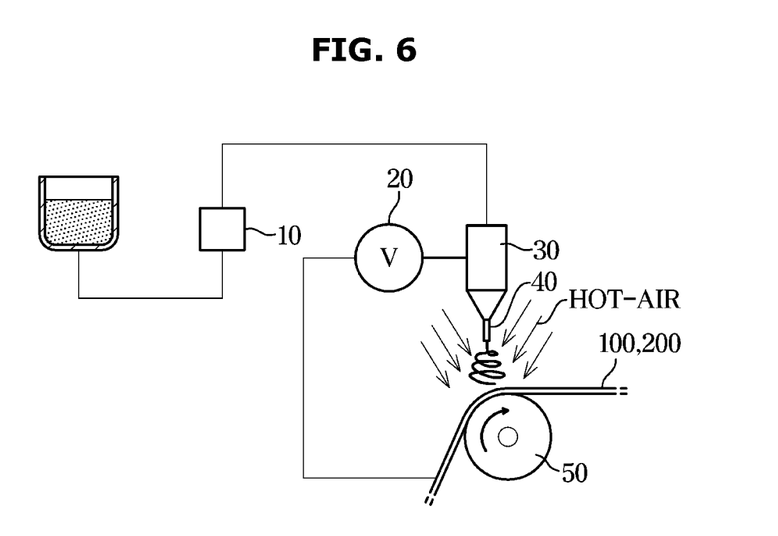
FIG. 6 shows a schematic view of an exemplary electrospinning device used in an exemplary method of manufacturing an exemplary fibrous adhesive layer according to an exemplary embodiment of the present invention.

FIG. 6 shows a schematic view of an electrospinning device used in a method of manufacturing a fibrous adhesive layer according to an embodiment of the present invention.

As shown in FIG. 6, the electrospinning apparatus may include a pump 10 capable of pushing out a binder polymer solution having a viscosity of a liquid phase, a DC high-voltage power supply 20, a nozzle 30, and a needle 40 for producing) binder polymer fibers and a roll or conveyor belt 50.

In the electrospinning apparatus, when an electrostatic force is applied to a binder polymer solution or melt having a sufficient viscosity, fibers are formed. The binder polymer solution distributed at the tip of the vertically positioned needle 40 is suspended from the tip in the form of a hemispherical droplet, in equilibrium between gravity and electrostatic repulsion and surface tension. When an electric field is applied thereto, a charge or dipole orientation on the hemispherical droplet surface is induced at the interface between the air layer and the solution, and a charge or dipole repulsion generates a force opposite to the surface tension.

Thus, the hemispherical surface of the solution suspended from the tip of the needle 40 is stretched into a conical shape known as Taylor Cone, as the electrostatic repulsion overcomes the surface tension at a constant critical electric field strength, the jet of the charged binder polymer solution is released from the Taylor cone tip.

This jet collapses into fine droplets due to surface tension when the viscosity of the solution is low. However, when the viscosity of the solution is high, the jet does not collapse but the solvent is evaporated while flowing in the air toward a collecting plate, and a continuous phase of the charged polymer fibers is accumulated on the collecting plate. As the jet flows toward the collecting plate, the solvent is evaporated while flowing in the air, and the continuous phase of the polymer fibers is accumulated on the separator or the electrode.

In order to generate such a continuous phase of the polymer fibers and to accumulate the fibers on the separator or the electrode, it is important that the fibrous phase has a certain level of adhesion when it reaches the separator or the electrode, which is correlated with a residual amount of the solvent contained in the fibrous phase. When the residual amount is greater than a predetermined amount, the adhesive force may be sufficient, but the fibrous phase may not be properly retained. On the contrary, when the residual amount is not sufficient, the fibrous phase may be maintained well, but the possibility of separation between the fibrous phase and the separator or the electrode increases due to the lack of adhesion of the fibrous itself.

On the solution side, it is necessary to maintain a suitable solid content (e.g., a sum of binder and ceramic material) in the solution. When the solid content is greater than a predetermined amount, it is difficult to form a jet at the tip of Taylor Cone, making it difficult to obtain a fibrous phase. On the contrary, when the solid content is less than a predetermined amount, the binder and ceramic materials will separate into particles, making it difficult to obtain fibers. The optimum solid content may be appropriately adjusted depending on the molecular weight of the binder used, the particle size of the ceramic materials, and the like.

Voltage between the needle and the collecting plate also affects the characteristics of the fiber. Generally, when the voltage is high, the fiber tends to have a small thickness. However, when the voltage is excessively high, the voltage is discharged into the air, and thus uneven and irregular fiber phase may be formed. Thus, it is important to maintain a proper voltage which may vary according to a humidity in the air, a distance between the needle and the current collector, a type of the solvent, and the like.

The distance between the needles and the collecting plate may affect various properties, including a boiling point of the solvent used in the solution, an amount of the solvent the fibrous phase contained when attached to the collecting plate, diameters of the fibers, and the spinning area. The fiber diameter tends to decrease and the spinning area tends to increase as the distance increases to a certain level. On the other hand, when the distance increases, the amount of the solvent contained in the fibrous phase tends to decrease. When the amount of the solvent is less than a predetermined amount, the fibers does not reach on the collecting plate (separator or electrode), resulting in a decrease in the yield and an increase in the possibility of separation from the separator or the electrode in a subsequent process, even though the fibers reached the collecting plate.

Air temperature, humidity, air velocity, and the like are also important factors in controlling the operation. When it is difficult to obtain desired properties by adjusting the solid content of the solution, the distance between the needle and the collecting plate, and the voltage, a fibrous phase having desired physical properties may be obtained by adjusting the air temperature, humidity, and air velocity. However, when an air velocity is greater than a predetermined range, the yield may decrease, so that it is necessary to limit a maximum air velocity. In particular, when an organic solvent is used, it is necessary to limit a temperature and a maximum concentration of the organic solvent that may be contained in the air in terms of safety.

In addition, the diameter and shape of the needle and the amount of solution supplied may also affect the physical properties. In the case where desired physical properties cannot be obtained by the control factors (solid content of the solution, voltage, distance between the needle and the collecting plate, air temperature, air velocity, etc.), when the supply rate of the solution is decreased, it is common to decrease the diameter of the needle to minimize changes in physical properties.

According to various exemplary embodiments of the present invention, the lithium secondary battery may have excellent shape stability of cells by improving adhesion between the electrode and the separator by introducing the fibrous adhesive layer into the separator or the electrode and excellent output characteristics of the lithium secondary battery by reducing cell resistance. Accordingly, the lithium secondary battery may be applicable to a stacked large-area cell.

Exemplary embodiments of the present invention have been described above with reference to the accompanying drawings. Those skilled in the art will appreciate that these inventive concepts may be embodied in different forms without departing from the scope and spirit of the invention. The disclosed embodiments have been described for illustrative purposes and not for limiting purposes.

What is claimed is:

1. A lithium secondary battery comprising:
   a positive electrode;
   a negative electrode;
   an electrolyte; and
   a separator positioned between the positive electrode and the negative electrode,
   wherein the separator comprises: a separator substrate; a fibrous adhesive layer formed on one or both surfaces of the separator substrate; and a ceramic coating layer positioned between the separator substrate and the fibrous adhesive layer, and
   wherein the fibrous adhesive layer has a form of a porous web and a fiber diameter of about 100 to 900 nm, and comprises a polymeric material comprising, a styrene-butadiene rubber (SBR)-based polymeric material.

2. The lithium secondary battery according to claim 1, wherein the fibrous adhesive layer has a thickness of about 0.5 to 3 μm.

3. The lithium secondary battery according to claim 1, wherein the fibrous adhesive layer further comprises: ceramic particles.

4. The lithium secondary battery according to claim 3, wherein the ceramic particles comprise one or more ceramic materials selected from the group consisting of $Al_2O_3$, $SiO_2$, $TiO_2$, $Al(OH)_3$, and $Mg(OH)_2$.

5. The lithium secondary battery according to claim 3, wherein the ceramic particles has a diameter of about 20 to 100 nm.

6. The lithium secondary battery according to claim 3, wherein a content of the ceramic particles is about 10 to 30% by weight based on the total weight of the fibrous adhesive layer.

7. A vehicle comprising a lithium secondary battery of claim 1.

8. A lithium secondary battery comprising:
   an electrode including a positive electrode and a negative electrode;
   a separator positioned between the positive electrode and the negative electrode;
   and an electrolyte;
   wherein each of the positive electrode and the negative electrode comprises: an electrode current corrector; and a fibrous adhesive layer formed on an active material layer; and the active material layer positioned between the electrode current corrector and the fibrous adhesive layer,
   wherein the fibrous adhesive layer has a fiber diameter of about 100 to 900 nm, and comprises a polymeric material comprising one or more selected from the group consisting of a polyacrylic acid (PAA)-based polymeric material, a styrene-butadiene rubber (SBR)-based polymeric material, a polyvinyl alcohol (PVA)-based polymeric material, and a poly vinyl acetate-based polymeric material, and a copolymer thereof,
   wherein the fibrous adhesive layer further comprises ceramic particles, and
   wherein the ceramic particles comprises one or more ceramic materials selected from the group consisting of $Al_2O_3$, $SiO_2$, $TiO_2$, $Al(OH)_3$, $Mg(OH)_2$.

9. The lithium secondary battery according to claim 8, wherein the fibrous adhesive layer has a thickness of about 0.5 to 3 μm.

10. The lithium secondary battery according to claim 8, wherein the ceramic particles has a diameter of about 20 to 100 nm.

11. The lithium secondary battery according to claim 8, wherein a content of the ceramic particles is about 10 to 30% by weight based on the total weight of the fibrous adhesive layer.

12. A vehicle comprising a lithium secondary battery of claim 8.

* * * * *